United States Patent [19]
Welsch

[11] 3,823,513
[45] July 16, 1974

[54] MINIATURE BELT GRINDER
[75] Inventor: Walter N. Welsch, Tonawanda, N.Y.
[73] Assignee: Dynabrade, Inc., Tonawanda, N.Y.
[22] Filed: Oct. 12, 1973
[21] Appl. No.: 406,005

[52] U.S. Cl. .............................................. 51/170 EB
[51] Int. Cl. ............................................ B24b 23/00
[58] Field of Search...... 51/170 EB, 170 R, 135 BT, 51/135 R

[56] References Cited
UNITED STATES PATENTS
3,427,757   2/1969   Redman ........................... 51/170 EB
3,619,949   11/1971  Welsch et al. .................... 51/170 EB
3,713,255   1/1973   Welsch ............................ 51/170 EB Primary Examiner—James L. Jones, Jr.
Attorney, Agent, or Firm—Bean & Bean

[57] ABSTRACT

A hand tool grinder having an endless belt entrained about a non-parallel drive and idler pulleys such that the flights thereof pass over a pair of direction change pulleys. The idler pulley and direction change pulleys are mounted adjacent opposite ends of a compound arm having an adjustment device to effect relative tilting movements of the idler pulley mounting end of the arm for controlling tracking of non-uniformly worn belts.

5 Claims, 3 Drawing Figures

PATENTED JUL 16 1974 3,823,513

MINIATURE BELT GRINDER

SUMMARY OF THE INVENTION

The invention relates to hand tool grinders particularly adapted for use within small cavities or restricted openings in sheet metal, castings, forgings and the like for deburring and finishing operations.

Grinders in which the present invention possess utility feature an endless abrasive surface belt; a casing; drive means including a belt driving pulley mounted within the casing and having its axis for rotation extending generally longitudinally with respect to the casing; an elongated arm mounted on the casing and projecting longitudinally therefrom; a belt supporting idler pulley mounted on a forwardly projecting end of the arm and having its axis of rotation extending generally vertically with respect to the casing; and a pair of direction change pulleys on a rearwardly disposed end of the arm for respectively supporting flights of the belt extending between the drive and idler pulleys, the direction change pulleys having their axes of rotation extending generally transversely of the casing and causing portions of the flight extending between the direction change pulleys and the idler pulley to undergo a substantially 90° twist and to straddle that portion of the arm projecting from the casing.

Under normal operating conditions, the belt is ofttimes worn non-uniformly along its marginal edges, due to the manner in which the tool is used by a workman. When this condition occurs, sometimes within a matter of movements depending on the work and quality of the belt, there is a tendency for the belt to stretch non-uniformly or elongate to a greater extent along that marginal edge subject to excess wear. This in turn creates a tendency for the belt to move or shift axially of the direction change pulley over which the belt moves from the idler pulley towards the drive pulley, and axially of the idler pulley. This problem of belt shifting relative to the direction change pulley has previously been solved by the invention disclosed in U.S. Pat. No. 3,619,949.

The present invention solves the problem of belt shifting movements relative to the idler pulley by providing a compound arm construction including an adjustment device for effecting tilting movement of the axis of rotation of the idler pulley within a vertical plane extending lengthwise of the arm in order to adjustably maintain opposite marginal edge portions of the belt under uniform tension. Tilting movements of the axis of the idler pulley in this manner do not adversely effect belt tracking about the direction change pulleys.

The present invention will now be more fully described with reference to the accompanying drawing wherein.

DETAILED DESCRIPTION

Figure 1:
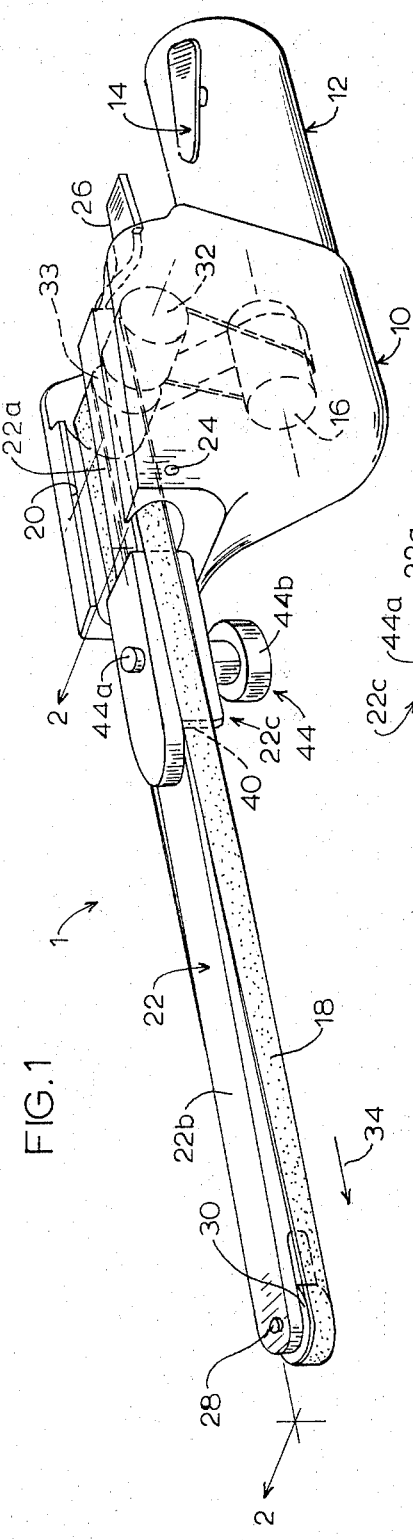
FIG. 1 is a perspective view of a tool embodying the present invention.

Now referring to the drawing in detail, a tool modified in accordance with the present invention is generally designated as 1 and shown as having a casing 10 and an associated power source, such as a pneumatically operated motor 12, which may be gripped by the hand of an operator for the purpose of manipulating the tool. Motor 12 may have any suitable shutoff or speed control, such as that afforded by pivotally supported lever 14, which is adapted to be squeezed by the hand of an operator during use. However, it will be understood that the invention to be hereinafter described is not limited to the use of a pneumatically operated motor or the illustrated design of casing 10. Thus, as by way of example, the operating motor may be electric and housed within a casing having a pistol like hand grip.

Extending forwardly of motor 12 through the rear of casing 10 is a drive shaft, not shown, for mounting a drive pulley 16 for rotation about an axis extending generally longitudinally of casing 10; pulley 16 serving to frictionally drive a flexible, endless abrasive belt 18.

Referring particularly to FIG. 1, it will be seen that the casing is cut away so as to define a through opening 20, and that an elongated arm device 22 is positioned in opening 20 and supported intermediate its front and rear ends for pivotal movement about an axis extending transversely of casing 10 by a pivot pin or shaft 24. A suitable spring device, not shown, is mounted between the bottom of arm device 22 and an internal surface of casing 10 for the purpose of continuously biasing the arm device for movement about pivot pin 24 in a counter-clockwise direction, as viewed in FIG. 1. It will be understood that this spring device serves to maintain desired operating tension on belt 18, when the latter is mounted on tool 1 in the manner to be described.

The rear end of arm device 22 terminates in a hand or thumb press lever extension 26, which may be employed to pivot the arm device in a clockwise sense against the bias of the above mentioned spring device in order to permit removal and replacement of belt 18.

As best shown in FIG. 1, arm device 22 projects forwardly of casing 10 and mounts adjacent the forward or freely projecting end thereof a shaft 28 serving to journal an idler roller 30 for rotation about an axis extending vertically and at a substantially right angle to a line running lengthwise of the arm device. It will be understood that in the normal operating position of arm device 22, shown in FIG. 1, the axis of idler pulley 30 also extends substantially vertically with respect to casing 10.

A pair of crown-surfaced direction change pulleys 32 and 33 are supported adjacent the rearwardly disposed end of arm device 22 for rotation about axes which extend generally transversely of both arm device 22 and casing 10. As will be apparent from the drawing, pulleys 32 and 33 serve to support the flights of belt 18 extending between idler pulley 30 and drive pulley 16, such that each flight of the belt is turned through substantially 90° in that portion thereof extending between the drive pulley and the direction change pulleys, and again through substantially 90° in that portion thereof extending between the direction change pulleys and the idler pulley. During the latter portion of the belt flights, belt 18 is forced to closely straddle arm device 22 thereby insuring that the belt affords a small frontal area in order to facilitate entry thereof through restricted access openings.

In the arrangement illustrated, belt 18 is driven by drive pulley 16 for movement in the direction indicated by arrow 34, such that direction change pulleys 32 and 33 may be characterized as forward and return pulleys, respectively.

As thus far described, the tool of the present invention is similar in construction and mode of operation to that described in U.S. Pat. Nos. 3,427,757; 3,619,949 and 3,713,255, and thus forms no part of the present invention other than in combination with the improvement now to be described.

In accordance with the present invention, arm device 22 is formed with a first or rear part 22a, which is pivotally secured to the casing by pivot pin 24 and serves to mount direction change pulleys 32 and 33; a second or front part 22b, which serves to mount idler pulley 30; and an attachment arrangement 22c, which serves to attach adjacent ends of arm parts 22a and 22b and to adjustably tilt the axis of rotation of idler pulley 30 within a vertical plane extending lengthwise of the arm device.

Specifically, attachment arrangement 22c, includes an elongated slot 40, which opens forwardly and downwardly through the forward end of arm part 22a and is dimensioned to removably receive the rear end of arm part 22b; a spring device, such as coil spring 42; and fastener device 44 for attaching adjacent ends of the arm parts and for effecting relative tilting movements thereof. Fastener device 44 includes a threaded shank portion 44a and an enlarged diameter head portion 44b.

Figure 3:
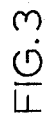
FIG. 3 is a sectional view taken generally along the line 3—3 in FIG. 2.
Figure 2:
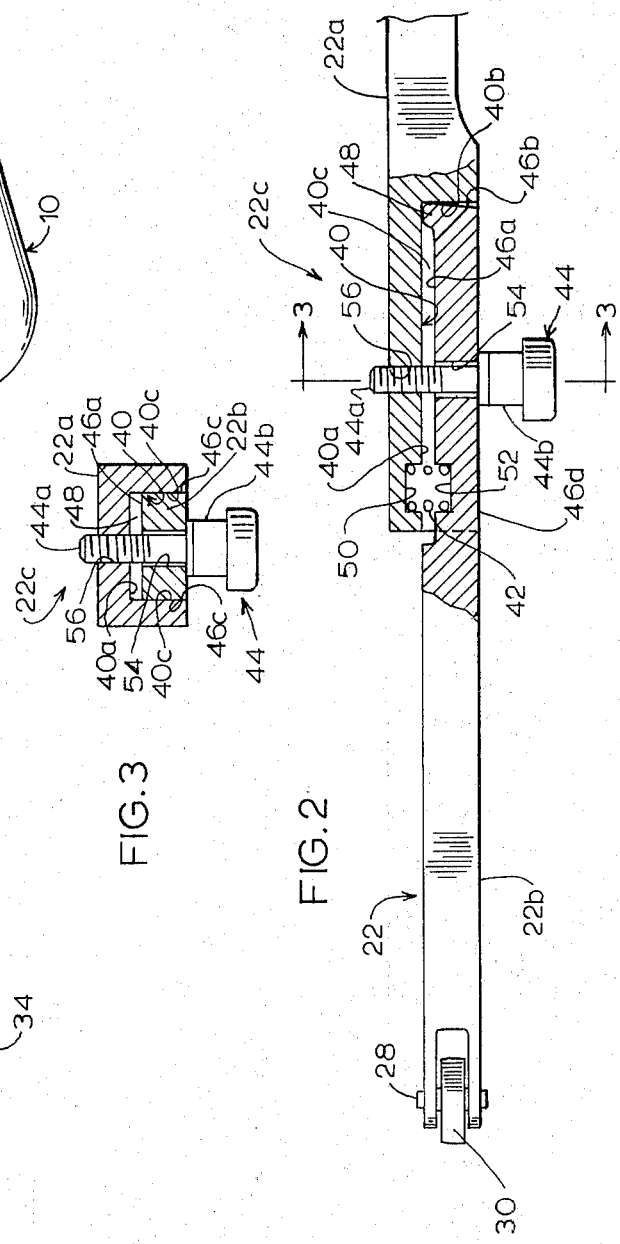
FIG. 2 is a sectional view taken generally along the line 2—2 in FIG. 1.

As best shown in FIGS. 2 and 3, slot 40 is bounded by a horizontally disposed and downwardly facing first surface portion 40a; a generally vertically disposed second or rear bearing surface portion 40b, which extends transversely of arm part 22a; and a pair of parallel vertically disposed guide surface portions 40c, which extend lengthwise of arm part 22a forwardly of surface 40b. The rear end of arm part 22b may be considered as having a horizontally disposed and upwardly facing first surface portion 46a, which is adapted to face slot surface 40a; a generally vertically disposed second or rear surface 46b, which is adapted to face slot surface 40b; and a pair of parallel vertically disposed side surfaces 46c, which are adapted to slidably engage with slot guide surfaces 40c, during vertical tilting movements of arm part 22b relative to arm part 22a. Preferably, second arm part rear surface 46b is slightly undercut or inclined to facilitate tilting of the second arm part in the manner to be described.

In the illustrated construction, the rear end of arm part 22b is formed with an upstanding bearing ridge 48, which extends transversely of the arm adjacent the juncture of surface portions 46a and 46b and is adapted to bear on arm part 22a adjacent the juncture of slot surfaces 40a and 40b in order to define a second arm part pivot or tilting axis arranged essentially parallel to the arm device pivot axis defined by pin 24. As an alternative construction, the bearing ridge may be formed as an integral projection of slot surface 40a and arranged to bear on surface 46a or surfaces 40b and 46b may be formed with a cooperating projecting and groove arrangement, not shown, to accommodate for relative tilting of the arm parts.

Also in the illustrated construction, facing surface portions 40a and 46a are formed with recesses 50 and 52, respectively, which serve to seat opposite ends of coil spring 42; and fastener device shank portion 44a is loosely passed through second arm part bore opening 54 and threadably received within first arm part threaded opending 56 in order to place its associated head portion 44b in clamping engagement with second arm part lower surface 46d.

When abrasive belt 18 is either unworn or worn in a uniform manner in a direction transversely thereof, the several elements of arm device 22 occupy their relative positions shown in FIG. 2. In this condition, the normal thesion in belt 18 serves to maintain rear surface 46b (or the rear surface of ridge 48) in bearing engagement with slot surface 40b and fastener device 44 serves to maintain the upper surface of ridge 48 in bearing engagement with slot surface 40a and spring 42 in a partially compressed condition. When the marginal edge portions of belt 18 become non-uniformly worn, the edge subject to the most wear tends to elongate with the result that there is a tendency for the belt to move or shift in a direction axially of idler pulley 30 and in some cases to ride completely off the idler pulley.

In accordance with the present invention, proper tracking of a non-uniformly worn belt relative to idler pulley 30 is achieved by employing adjustments of fastener device 44 to pivot second arm part 22b relative to first arm part 22a such that the axis of rotation of the idler pulley is tilted within a vertical plane extending lengthwise of arm device 22. By tilting the axis of the idler pulley in this manner, the non-uniformly worn marginal edges of the belt may be maintained under essentially uniform tension in order to re-establish proper tracking of the belt relative to the idler pulley without adversely effecting overall belt tension or belt tracking relative to the direction change and drive pulleys.

As by way of specific example, when the lower marginal edge of belt 18 in passing to idler pulley 30 is worn sufficiently to result in its elongation, fastener device 44 is tightened with the result that second arm part 22b is tilted upwardly against the bias of spring 42. Conversely, when the upper marginal edge of the belt becomes disproportionately worn, fastener device 44 is loosened with the result that spring 42 is permitted to expand and bias second arm part 22b downwardly relative to first arm part 22a. As a practical matter, proper tracking of belt 18 relative to idler pulley 30 may be achieved by relatively small angular displacements of arm part 22b, e.g. plus or minus 5 percent from the position shown in FIG. 2.

While only the preferred construction of the present invention has been specifically illustrated in the drawing, it will be readily apparent that various changes may be made therein without influencing its mode of operation, as for instance, changes involving the mere reversal of the parts or elements comprising attachment arrangement 22c.

I claim:

1. In a hand tool grinding device having an endless abrasive surface belt; drive means; a casing for supporting said drive means, said drive means including a belt driving pulley having its axis of rotation extending generally longitudinally with respect to said casing; an elongated arm; pivot means for supporting said arm intermediate front and rear ends thereof on said casing for vertical pivotal movements about a first pivot axis extending transversely thereof; a belt supporting idler pulley mounted on said front end of said arm and having its axis of rotation normally extending generally vertically with respect to said casing and said arm; a pair of direction change pulleys mounted on said rear end of said arm for respectively supporting flights of said belt extending between said drive and idler pulleys, said direction change pulleys having their axes of rotation extending generally transversely of said arm and said casing and causing portions of said flights extending between said direction change pulleys and said idler pulley to undergo a substantially 90° twist and to straddle said arm, the improvement wherein:

said arm includes a first part pivotally supported on said casing by said pivot means and mounting said direction change pulleys thereon; a second part for mounting said idler pulley; and means for attaching adjacent ends of said arm parts to adjustably tilt the axis of rotation of said idler pulley within a vertical plane extending lengthwise of said arm, whereby to adjustably maintain opposite marginal edge portions of said belt passing between said idler pulley and said direction change pulleys under essentially uniform tension.

2. In a device according to claim 1, wherein said attachment means including means defining a second pivot axis arranged essentially parallel to said first pivot axis, spring means tending to tilt said second arm part relative to said first arm part about said second pivot axis in a first direction, and means for attaching said arm parts together and for tilting said second arm part relative to said first arm part about said second pivot axis in a direction opposite to said first direction against the bias of said spring means.

3. In a device according to claim 1, wherein said attachment means includes bearing means defining a second pivot axis arranged essentially parallel to said first pivot axis, spring means tending to tilt said second arm part relative to said first arm part about said second pivot axis in a first direction, a threaded opening extending vertically through one of said adjacent ends, an aperture opening vertically through the other of said adjacent ends, a fastener device freely extending through said aperture and threadably received within threaded opening for attaching said adjacent ends and for tilting said second arm part relative to said first arm part about said second pivot axis in a direction opposite to said first direction against the bias of said spring means.

4. In a device according to claim 1, wherein said attaching means includes facing surfaces defined by said adjacent ends, said surfaces having first surface portions extending generally horizontally and lengthwise of said arm parts and having second surface portions extending generally vertically and transversely of said arm parts, said surfaces defining adjacent the juncture of said surface portions bearing surfaces cooperating to define a second pivot axis disposed essentially parallel to said first pivot axis, a spring arranged between said first surface portions for tilting of said second arm part relative to said first arm part about said second pivot axis in a first direction, and an attachment device disposed intermediate said spring device and said bearing surfaces for attaching said adjacent ends together and for tilting said second arm part relative to said first arm part about said second pivot axis in a direction opposite to said first direction against the bias of said spring.

5. In a device according to claim 4, wherein said attachment device includes a threaded shank portion dimensioned to be freely accommodated within a bore opening extending vertically through said first surface portion of one of said adjacent ends and threadably received within a threaded opening extending vertically through said first surface portion of the other of said adjacent ends and an enlarged head portion dimensioned to engage said one adjacent end for tilting said second arm part as aforesaid.

* * * * *